United States Patent
Yuan

(10) Patent No.: US 10,685,389 B2
(45) Date of Patent: Jun. 16, 2020

(54) SHOPPING LIST CREATOR AND OPTIMIZER

(71) Applicant: eBay Inc., San Jose, CA (US)

(72) Inventor: Mark Delun Yuan, San Mateo, CA (US)

(73) Assignee: eBay Inc., San Jose, CA (US)

( * ) Notice: Subject to any disclaimer, the term of this patent is extended or adjusted under 35 U.S.C. 154(b) by 833 days.

(21) Appl. No.: 14/925,526

(22) Filed: Oct. 28, 2015

(65) Prior Publication Data

US 2016/0048905 A1 Feb. 18, 2016

Related U.S. Application Data

(63) Continuation of application No. 13/599,580, filed on Aug. 30, 2012, now abandoned.

(51) Int. Cl.
*G06Q 30/06* (2012.01)

(52) U.S. Cl.
CPC ..... *G06Q 30/0635* (2013.01); *G06Q 30/0633* (2013.01); *G06Q 30/0639* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 2,465,971 A | 3/1949 | Leblang | |
| 2,931,657 A | 4/1960 | Lewis | |
| 3,252,243 A | 5/1966 | Doyle et al. | |
| 3,675,215 A | 7/1972 | Arnold et al. | |
| 3,717,942 A | 2/1973 | Presby | |
| 5,408,417 A | 4/1995 | Wilder | |
| 5,605,332 A | 2/1997 | Harnett | |
| 6,134,674 A | 10/2000 | Akasheh | |

(Continued)

FOREIGN PATENT DOCUMENTS

| WO | WO-2012135293 A2 | 10/2012 |
|---|---|---|
| WO | WO-2015023367 A1 | 2/2015 |

OTHER PUBLICATIONS

Matthias Kaiser and Christine Mueller "The Shopping Scout: A Framework for an Intelligent Shopping Assistant" (Year: 2005).*

(Continued)

*Primary Examiner* — Allen C Chein
(74) *Attorney, Agent, or Firm* — Schwegman Lundberg & Woessner, P.A.

(57) ABSTRACT

A mobile app for a mobile device includes logic for an overlay for the UI of the mobile device, and a location on the UI where the overlay is to be displayed, as specified by the user. The mobile app also comprises a scanning layer to create a list of items to be located and acquired. Instructions for locating the items, and objectives for ordering the locations of the items on the overlay are received from the user. The objectives may be for a trip to acquire the items, such as total cost, time, number of stops, preferred establishments for acquiring the items, preferred brands of the items, and other bases. The locations of the items are identified and filtered in accordance with the instructions. The locations of the items are displayed on the overlay at the area of the user interface specified by the user, according to geographical location.

15 Claims, 9 Drawing Sheets

(56) References Cited

U.S. PATENT DOCUMENTS

| | | | |
|---|---|---|---|
| 6,146,721 A | 11/2000 | Freynet | |
| 6,216,134 B1 | 4/2001 | Heckerman et al. | |
| 6,244,926 B1 | 6/2001 | George et al. | |
| 6,363,388 B1 | 3/2002 | Sprenger et al. | |
| 6,561,417 B1 | 5/2003 | Gadd | |
| 6,567,797 B1 | 5/2003 | Schuetze et al. | |
| 6,714,945 B1 | 3/2004 | Foote et al. | |
| 6,804,662 B1 | 10/2004 | Annau et al. | |
| 6,970,101 B1 | 11/2005 | Squire et al. | |
| 7,082,365 B2 | 7/2006 | Sheha et al. | |
| 7,240,025 B2 | 7/2007 | Stone et al. | |
| 7,363,214 B2 | 4/2008 | Musgrove et al. | |
| 7,519,562 B1 | 4/2009 | Vander Mey et al. | |
| 7,568,004 B2 | 7/2009 | Gottfried | |
| 7,587,359 B2 | 9/2009 | Levy et al. | |
| 7,689,916 B1 | 3/2010 | Goel et al. | |
| 7,752,082 B2 | 7/2010 | Calabria | |
| 7,756,757 B1 | 7/2010 | Oakes, III | |
| 7,761,339 B2 | 7/2010 | Alivandi | |
| 7,827,074 B1 | 11/2010 | Rolf | |
| 7,848,765 B2 | 12/2010 | Phillips et al. | |
| 7,878,891 B2 | 2/2011 | Chiu | |
| 8,127,253 B2 | 2/2012 | Sauve et al. | |
| 8,166,040 B2 | 4/2012 | Brindisi et al. | |
| 8,628,087 B2 | 1/2014 | Knowlton et al. | |
| 2002/0002504 A1 | 1/2002 | Engel et al. | |
| 2002/0027694 A1 | 3/2002 | Kim et al. | |
| 2002/0103647 A1* | 8/2002 | Houplain | G10L 15/26 704/260 |
| 2002/0174021 A1 | 11/2002 | Chu et al. | |
| 2002/0178014 A1 | 11/2002 | Alexander et al. | |
| 2003/0004831 A1 | 1/2003 | Owens | |
| 2003/0018652 A1 | 1/2003 | Heckerman et al. | |
| 2003/0028873 A1 | 2/2003 | Lemmons | |
| 2003/0200159 A1 | 10/2003 | Kay et al. | |
| 2004/0153505 A1 | 8/2004 | Verdi et al. | |
| 2004/0205394 A1* | 10/2004 | Plutowski | G06Q 30/06 714/21 |
| 2004/0243501 A1* | 12/2004 | Duffey, Jr. | G06Q 10/107 705/37 |
| 2005/0004850 A1 | 1/2005 | Gutbrod et al. | |
| 2005/0050576 A1* | 3/2005 | Upendran | G06Q 30/02 725/110 |
| 2005/0174591 A1 | 8/2005 | Sowinski et al. | |
| 2005/0222987 A1 | 10/2005 | Vadon | |
| 2006/0004850 A1 | 1/2006 | Chowdhury | |
| 2006/0058948 A1 | 3/2006 | Blass et al. | |
| 2006/0085270 A1 | 4/2006 | Ruckart | |
| 2006/0113383 A1 | 6/2006 | Scott et al. | |
| 2006/0149625 A1 | 7/2006 | Koningstein | |
| 2006/0190293 A1 | 8/2006 | Richards | |
| 2006/0218153 A1 | 9/2006 | Voon et al. | |
| 2006/0265234 A1 | 11/2006 | Peterkofsky et al. | |
| 2007/0150369 A1 | 6/2007 | Zivin | |
| 2007/0198505 A1 | 8/2007 | Fuller | |
| 2007/0244758 A1* | 10/2007 | Xie | G06O 30/02 705/14.51 |
| 2007/0290037 A1 | 12/2007 | Arellanes et al. | |
| 2008/0046956 A1 | 2/2008 | Kulas | |
| 2008/0059970 A1 | 3/2008 | Gonen | |
| 2008/0104054 A1 | 5/2008 | Spangler | |
| 2008/0114807 A1 | 5/2008 | Sembower | |
| 2008/0154710 A1 | 6/2008 | Varma | |
| 2008/0163311 A1 | 7/2008 | St John-larkin | |
| 2008/0176545 A1 | 7/2008 | Dicke et al. | |
| 2008/0186226 A1 | 8/2008 | Ratnakar | |
| 2008/0208852 A1 | 8/2008 | Kuttikkad et al. | |
| 2008/0285940 A1 | 11/2008 | Kulas | |
| 2009/0006208 A1 | 1/2009 | Grewal et al. | |
| 2009/0012953 A1* | 1/2009 | Chu | G01C 21/3679 |
| 2009/0019487 A1 | 1/2009 | Kulas | |
| 2009/0055199 A1 | 2/2009 | Yusuf et al. | |
| 2009/0083096 A1 | 3/2009 | Cao et al. | |
| 2009/0144624 A1 | 6/2009 | Barnes, Jr. | |
| 2009/0228342 A1 | 9/2009 | Walker et al. | |
| 2009/0258687 A1 | 10/2009 | Weichselbaum | |
| 2009/0271293 A1 | 10/2009 | Parkhurst et al. | |
| 2009/0299824 A1 | 12/2009 | Barnes, Jr. | |
| 2009/0319373 A1 | 12/2009 | Barrett | |
| 2010/0049663 A1 | 2/2010 | Kane, Jr. et al. | |
| 2010/0082447 A1 | 4/2010 | Lin et al. | |
| 2010/0153378 A1 | 6/2010 | Sardesai | |
| 2010/0161605 A1 | 6/2010 | Gabrilovich et al. | |
| 2010/0198700 A1 | 8/2010 | Ramaswamy et al. | |
| 2010/0211900 A1 | 8/2010 | Fujioka | |
| 2010/0257024 A1 | 10/2010 | Holmes et al. | |
| 2010/0281029 A1 | 11/2010 | Parikh et al. | |
| 2010/0332283 A1 | 12/2010 | Ng et al. | |
| 2011/0004517 A1 | 1/2011 | Soto et al. | |
| 2011/0040655 A1 | 2/2011 | Hendrickson et al. | |
| 2011/0078305 A1 | 3/2011 | Varela | |
| 2011/0144908 A1* | 6/2011 | Cheong | G06Q 30/06 701/533 |
| 2011/0153614 A1 | 6/2011 | Solomon | |
| 2011/0173191 A1 | 7/2011 | Tsaparas et al. | |
| 2011/0184780 A1 | 7/2011 | Alderson et al. | |
| 2011/0187306 A1 | 8/2011 | Aarestrup et al. | |
| 2011/0202394 A1 | 8/2011 | Borom et al. | |
| 2011/0238478 A1 | 9/2011 | Gottfurcht et al. | |
| 2012/0016678 A1* | 1/2012 | Gruber | G10L 15/22 704/275 |
| 2012/0054204 A1 | 3/2012 | Agarwal et al. | |
| 2012/0084812 A1 | 4/2012 | Thompson et al. | |
| 2012/0123673 A1* | 5/2012 | Perks | G06Q 30/0631 701/426 |
| 2012/0130792 A1 | 5/2012 | Polk, Jr. et al. | |
| 2012/0150436 A1 | 6/2012 | Rossano et al. | |
| 2012/0166322 A1 | 6/2012 | Simon et al. | |
| 2012/0185330 A1 | 7/2012 | Kleinrock et al. | |
| 2012/0197764 A1 | 8/2012 | Nuzzi et al. | |
| 2012/0203614 A1 | 8/2012 | Chen et al. | |
| 2012/0203639 A1 | 8/2012 | Webster et al. | |
| 2012/0235817 A1 | 9/2012 | Forster | |
| 2012/0239513 A1 | 9/2012 | Oliver et al. | |
| 2012/0253908 A1 | 10/2012 | Ouimet et al. | |
| 2012/0269116 A1 | 10/2012 | Xing et al. | |
| 2012/0303479 A1 | 11/2012 | Derks et al. | |
| 2012/0313969 A1 | 12/2012 | Szymczyk et al. | |
| 2013/0030955 A1 | 1/2013 | David et al. | |
| 2013/0071816 A1 | 3/2013 | Singh et al. | |
| 2013/0086029 A1 | 4/2013 | Hebert | |
| 2013/0124189 A1 | 5/2013 | Baldwin et al. | |
| 2013/0132221 A1 | 5/2013 | Bradford et al. | |
| 2013/0185679 A1 | 7/2013 | Fretwell et al. | |
| 2013/0191723 A1 | 7/2013 | Pappas et al. | |
| 2013/0198002 A1 | 8/2013 | Nuzzi et al. | |
| 2013/0244784 A1 | 9/2013 | Assa | |
| 2013/0267253 A1* | 10/2013 | Case | H04W 4/021 455/456.3 |
| 2013/0297317 A1* | 11/2013 | Lee | H04M 1/72552 704/270.1 |
| 2013/0325839 A1 | 12/2013 | Goddard et al. | |
| 2014/0006389 A1 | 1/2014 | Garcia et al. | |
| 2014/0067564 A1 | 3/2014 | Yuan et al. | |
| 2014/0095348 A1* | 4/2014 | Goulart | G06Q 30/0633 705/26.8 |
| 2014/0176565 A1 | 6/2014 | Adeyoola et al. | |
| 2014/0213333 A1 | 7/2014 | Hanes et al. | |
| 2015/0024840 A1 | 1/2015 | Poon et al. | |
| 2015/0052171 A1 | 2/2015 | Cheung | |

OTHER PUBLICATIONS

"U.S. Appl. No. 14/067,795, Examiner Interview Summary dated Aug. 17, 2016", 3 pgs.

"U.S. Appl. No. 14/067,795, Final Office Action dated Jun. 1, 2016", 13 pgs.

"U.S. Appl. No. 14/067,795, Response filed Feb. 25, 2016 to Non Final Office Action dated Sep. 25, 2015", 09 pgs.

"U.S. Appl. No. 14/067,795, Response filed Jul. 26, 2016 to Final Office Action dated Jun. 1, 2016", 12 pgs.

(56) References Cited

OTHER PUBLICATIONS

"AgingBooth—Android Apps on Google Play", [Online]. Retrieved from the Internet: <URL: https://play.google.com/store/apps/details?id=com.piviandco.agingbooth&hl=en>, (Accessed May 3, 2013), 2 pgs.
"U.S. Appl. No. 13/011,324 , Response filed Aug. 19, 2013 to Non Final Office Action dated Apr. 18, 2013", 15 pgs.
"U.S. Appl. No. 13/011,324, Advisory Action dated Feb. 28, 2014", 3 pgs.
"U.S. Appl. No. 13/011,324, Amendment filed Jan. 28, 2015", 32 pgs.
"U.S. Appl. No. 13/011,324, Appeal Brief filed Aug. 22, 2014", 19 pgs.
"U.S. Appl. No. 13/011,324, Examiner's Answer dated Nov. 28, 2014", 18 pgs.
"U.S. Appl. No. 13/011,324, Final Office Action dated Sep. 30, 2015", 24 pgs.
"U.S. Appl. No. 13/011,324, Final Office Action dated Nov. 22, 2013", 16 pgs.
"U.S. Appl. No. 13/011,324, Non Final Office Action dated Mar. 10, 2015", 19 pgs.
"U.S. Appl. No. 13/011,324, Non Final Office Action dated Apr. 18, 2013", 17 pgs.
"U.S. Appl. No. 13/011,324, Response filed Jan. 22, 2014 to Final Office Action dated Nov. 22, 2013", 15 pgs.
"U.S. Appl. No. 13/011,324, Response filed Jun. 10, 2015 to Non Final Office Action dated Mar. 10, 2015", 27 pgs.
"U.S. Appl. No. 13/359,630, Final Office Action dated Sep. 22, 2015", 29 pgs.
"U.S. Appl. No. 13/359,630, Final Office Action dated Nov. 29, 2013", 21 pgs.
"U.S. Appl. No. 13/359,630, Non Final Office Action dated Jun. 7, 2013", 23 pgs.
"U.S. Appl. No. 13/359,630, Non Final Office Action dated Oct. 29, 2014", 29 pgs.
"U.S. Appl. No. 13/359,630, Notice of Non-Compliant Amendment dated Apr. 23, 2015", 3 pgs.
"U.S. Appl. No. 13/359,630, Response filed Mar. 30, 2015 to Non Final Office Action dated Oct. 29, 2014", 31 pgs.
"U.S. Appl. No. 13/359,630, Response filed Mar. 31, 2014 to Final Office Action dated Nov. 29, 2013", 17 pgs.
"U.S. Appl. No. 13/359,630, Response filed May 21, 2013 to Restriction Requirement dated Apr. 29, 2013", 10 pgs.
"U.S. Appl. No. 13/359,630, Response filed Jun. 23, 2015 to Non-Compliant Amendment, dated Apr. 23, 2015", 31 pgs.
"U.S. Appl. No. 13/359,630, Response filed Oct. 7, 2013 to Non Final Office Action dated Jun. 7, 2013", 15 pgs.
"U.S. Appl. No. 13/359,630, Restriction Requirement dated Apr. 29, 2013", 6 pgs.
"U.S. Appl. No. 13/539,379, Final Office Action dated Jun. 17, 2015", 14 pgs.
"U.S. Appl. No. 13/539,379, Non Final Office Action dated Dec. 12, 2014", 12 pgs.
"U.S. Appl. No. 13/539,379, Response filed Apr. 13, 2015 to Non Final Office Action dated Dec. 12, 2014", 15 pgs.
"U.S. Appl. No. 13/599,580 Response filed Apr. 14, 2015 to Notice of Non-Compliant Amendment dated Feb. 25, 2014", 7 pgs.
"U.S. Appl. No. 13/599,580, Final Office Action dated Jan. 15, 2014", 25 pgs.
"U.S. Appl. No. 13/599,580, Final Office Action dated May 1, 2015", 15 pgs.
"U.S. Appl. No. 13/599,580, Non Final Office Action dated Sep. 17, 2013", 20 pgs.
"U.S. Appl. No. 13/599,580, Non Final Office Action dated Nov. 14, 2014", 17 pgs.
"U.S. Appl. No. 13/599,580, Response filed Feb. 17, 2015 to Non Final Office Action dated Nov. 14, 2014", 19 pgs.
"U.S. Appl. No. 13/599,580, Response filed Apr. 15, 2014 to Final Office Action dated Jan. 15, 2014", 18 pgs.
"U.S. Appl. No. 13/599,580, Response filed Dec. 17, 2013 to Non Final Office Action dated Sep. 17, 2013", 18 pgs.
"U.S. Appl. No. 13/946,584, Non Final Office Action dated Apr. 9, 2015", 12 pgs.
"U.S. Appl. No. 13/946,584, Response filed Aug. 10, 2015 to Non Final office Action dated Apr. 9, 2015", 19 pgs.
"U.S. Appl. No. 14/067,795, Non Final Office Action dated Sep. 25, 2015", 10 pgs.
"Draw Something", [Online]. Retrieved from the Internet: <URL: http://omgpop.com/drawsomething>, (Accessed May 3, 2013), 1 pg.
"Exquisite Corpse", Wikipedia, [Online]. Retrieved from the Internet: <URL: http://en.wikipedia.org/wiki/Exquisite_corpse>, (Accessed Jun. 11, 2013), 3 pgs.
"Facebook Gives POLITICO Access to Your Political Beliefs", © 2012 Ology, [online]. Retrieved from the Internet: <URL: http://www.ology.com/post/51413/facebook-gives-politico-access-to-your-political-beliefs>, (Accessed Jun. 28, 2012), 4 pgs.
"International Application Serial No. PCT/US2014/044947, International Search Report dated Oct. 30, 2014", 2 pgs.
"International Application Serial No. PCT/US2014/044947, Written Opinion dated Oct. 30, 2014", 4 pgs.
"Mobitv", MobiTV, [Online]. Retrieved from the Internet: <URL: http://www.mobitv.com/>, (Accessed Mar. 30, 2015), 1 pgs.
"Slingbox", Sling Media, Inc., [Online]. Retrieved from the Internet: <URL: http://www.slingbox.com/>, (Accessed Mar. 30, 2015), 4 pgs.
Newby, Joe, "Facebook, Politico to measure sentiment of GOP candidates by collecting posts", © 2006-2012 Clarity Digital Group LLC d/b/a Examiner.com., [online]. Retrieved from the Internet: <URL: http://www.examiner.com/computer-user-in-national/facebook-to-measure-sentiment-of-gop-candidates-by-collecting-users-posts>, (Accessed Jun. 28, 2012), 3 pgs.
Sifry, Micah L, "Politico—Facebook Sentiment Analysis Will Generate Bogus Results, Expert Says", © 2012 Personal Democracy Media., [online]. Retrieved from the Internet: <URL: http://techpresident.com/news/21618/politico-facebook-sentiment-analysis-bogus>, (Jan. 13, 2012), 3 pgs.

* cited by examiner

US 10,685,389 B2

SHOPPING LIST CREATOR AND OPTIMIZER

This application is a continuation of U.S. patent application Ser. No. 13/599,580, filed on Aug. 30, 2012, the benefit of priority of which is claimed hereby, and which is incorporated by reference herein in its entirety.

TECHNICAL FIELD

The present application relates generally to the technical field of user interface presentation and, in one embodiment, to customizing an overlay for a user interface in a way specified by the user.

BACKGROUND

When a user accesses a web site via a network, the user interface (UI) display that is presented by the web site may not be in an area of UI that is satisfactory to a user. It is therefore desirable to allow the user to specify an area of the UI for display of information presented to the user. Further, the format of the display may not be satisfactory to the user. It is therefore also desirable to provide an overlay for displayed information that presents the information on the UI in a layout format that is satisfactory to the user. Currently users also cannot create a list of items from items that arrive to a user device via online content such as an email. A computer layer that facilitates creation of a list of items received as content is also desirable.

DESCRIPTION OF THE DRAWINGS

Some embodiments are illustrated by way of example and not limitation in the figures of the accompanying drawings.

DETAILED DESCRIPTION

Figure 1:
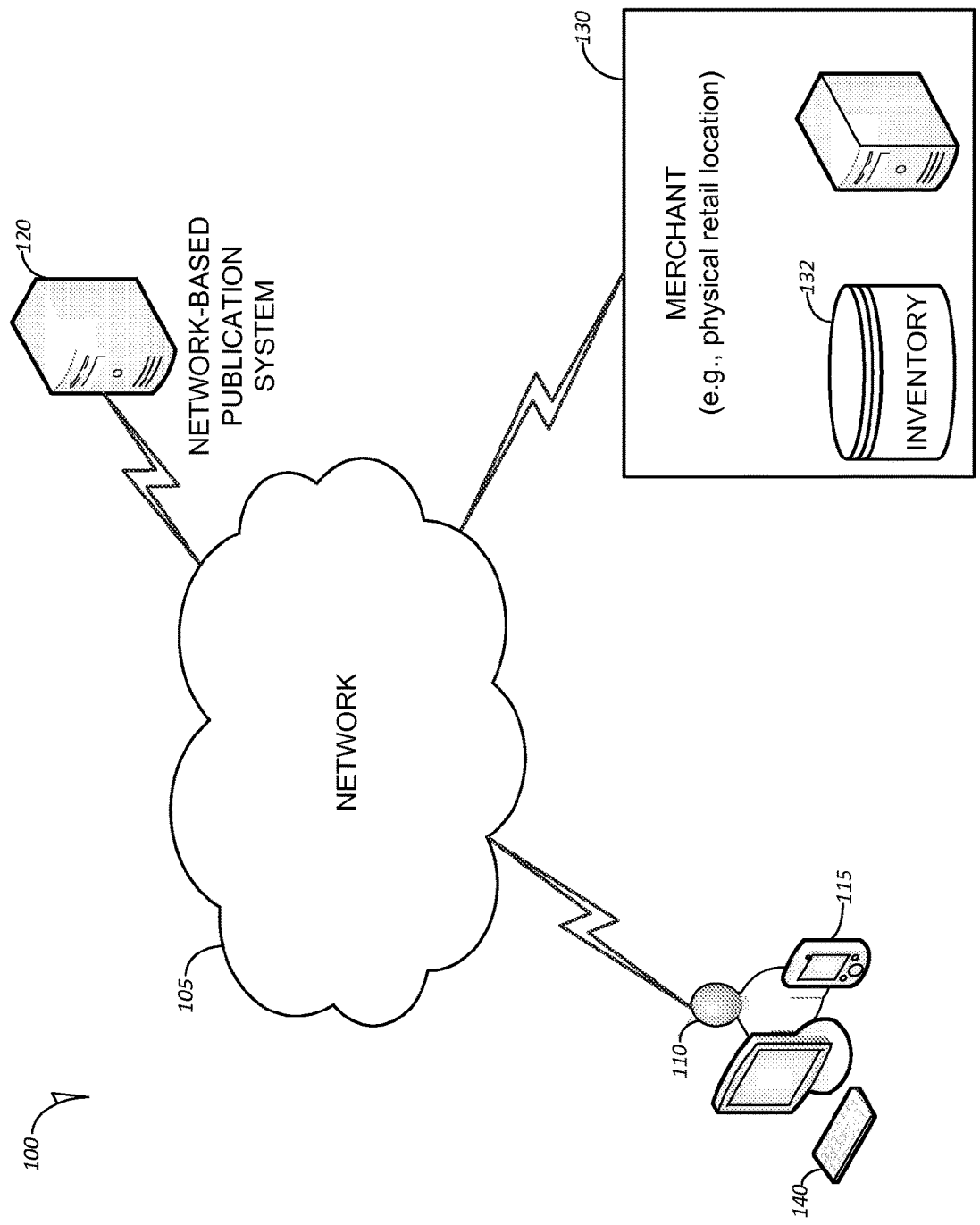
FIG. 1 is a block diagram depicting a system for optimizing lists of items to be located, where the items on the list are presented in a user-specified overlay for the UI, and where the items may be arranged in accordance with the distance and/or travel time between a user's location and the location of the items, the list optimized based on a predetermined objective according to an example embodiment.

The present disclosure describes data processing techniques for creating and optimizing a shopping list to order the obtaining of products and/or services (hereinafter "items") that are being offered via brick-and-mortar and/or online retail stores, and then present the optimized results in such a manner that conveys to the viewer in a simple and intuitive manner the distance and/or travel time between a location of the shopper, and one or more brick-and-mortar stores at which the items may be obtained, the optimization being based on a predetermined objective. In the following description, for purposes of explanation, numerous specific details are set forth in order to provide a thorough understanding of the various aspects of different embodiments. It will be evident, however, to one skilled in the art, that the present embodiments may be practiced without all of the specific details.

Creating the List of Items

Embodiments are not limited to mobile devices but could be implemented partly on a mobile device and partly on a laptop or other stationary computing device. The shopping list creator and optimizer may recognize a list of shopping items on a mobile device, either within a mobile app provided by a publication system such as eBay, Inc.,® or in a separate app. The list may be imported into the eBay app if found within an external application. In one embodiment, the list may be created by a shopper using an input mechanism (e.g., keyboard, camera, voice input) and then imported into the app. In some embodiments the shopping list to be optimized may be created by the shopper at home, or at some other location, using a computer. The optimized shopping list may be returned to the computer for use when the shopper embarks on the shopping trip. However, in many embodiments, the list is created on, or imported to, the mobile device, either manually by the shopper or automatically as more fully described below, and returned to the mobile device in optimized format. Alternatively, the optimized list may be returned to both the home computer and the mobile device for use as the shopper desires.

In another embodiment, the list may be created by the shopper using any of a variety of applications, including a cell phone note pad application. In another embodiment, the user may execute a search (on a search engine, website, or within (or associated with) the mobile app, etc.) and select items for inclusion on the list such as, for example, by searching the shopper's email, text messages, voice mail, photos, and other suitable content and create the list from the content. As one example, the shopper's wife may text the shopper, "don't forget the milk, also buy bread." The mobile app can be actuated and set to scan for a predetermined time period, a predetermined number of messages, or messages from a particular person, among other things, each of which may be set by the shopper, to determine relevant emails, texts (such as the above text message), voice mail, photos, instant chat messages, videos, and the like that are appropriately designated as including shopping list content. Recognition can be by appropriate reading technology for email and text, voice recognition for voice mails, and visual recognition for photos. The results of the scan may be sent to the publication system for use in conjunction with optimizing the list and detecting purchased items.

In some embodiments, a scanning layer or engine may be implemented, for example, just above the OS layer of the mobile device, and might be constantly or intermittently active for scanning the above emails, texts, chats, voice mails, photos, and the like for more efficiency for the shopper. For example, the scanning layer may execute in the background of the device and may activate itself upon detecting that a message is received by an account (e.g., email account, chat account, cellular account) associated with the mobile device. In either case, the layer or the app will extract out data such as the item names, quantities, brands, type, (e.g., organic) from the received message and add the extracted data to a shopping list. In some embodiments, the extracted data may include metadata accompanying the extracted data. Once a list is populated with one or more items extracted from a message, the scanning layer may return to a passive listening mode (to conserve device battery life, among other reasons) to await detection of another incoming message. In some embodiments, the scanning layer may be selectively enabled or disabled by the user to permit the user to exercise control over the privacy of the data contained on or received by the device. For ease of description, the app and the layer will be referred to collectively herein by the term "app" although one of ordinary skill in the art will readily recognize that either term could be used.

Optimizing the List of Items

Accordingly, the optimized shopping list may be provided to the shopper on the mobile phone, optionally with maps and directions. In some embodiments, the shopper location may be obtained automatically using a location system (e.g., GPS, triangulation, shopper input of location, wi-fi detection). Or the shopper may simply select a location on a map (using a pointing device, such as a mouse, or a finger or stylus with a touch screen display) to indicate a location at which the shopper will be at some future time and from which the distance or travel time to another locations such as stores for obtaining the items should be derived. With some embodiments, the shopper may define a circular region by simply dragging his or her finger or stylus (or taking a similar action with a pointing device) to specify a diameter, or radius, of a circle making up a circular region (see example illustrated in FIG. 8) from which search results should be presented. In other embodiments, the shopper may simply draw any closed shape to specify the region to be searched for local results. In yet other embodiments, the shopper may trace or highlight a specific road or set of roads that comprise a route that the shopper frequently travels.

In another embodiment a shopper that is using public transit may specify the number of the vehicle or transit route and the time of departure and the system, interacting with publically available route maps, may obtain the route of transit to be used to identify stores associated at which the items on the shopping list may be purchased, such that those stores closest in distance or travel time to any point along the route can be presented.

In other embodiments the app may take into account shopping objectives such as miles, minimum number of stops, bus or transit schedule, and routes. In one embodiment, if the shopper is traveling by public transit the stores searched may by definition be limited to those on or near the route of the particular public transit vehicle, and the app may also compute, using available historical data, how much an individual can carry by weight and bulk. In this regard, demographic data such the shopper's age and/or other physically identifying data (e.g., height, weight, gender) may be entered into the app to be factored in for optimizing, on the theory that older people may carry less than younger people. In other embodiments, a shopping objective may be meeting the shopper's preference history, such as the shopper's store preferences, shopper's brand preferences, and the shopper's item type preferences may be entered into the app and the shopping list optimized based on one or more of the objectives. For example, if the shopper's preference list indicates preference for Whole Foods® for groceries, Target® or Wal-Mart® for dry goods, and Home Depot® for building materials, the search may be limited to those stores. Of course, the above special price prompts may also be included.

With some embodiments, the optimized shopping list may be shown as a simple list, with each individual item entry including any one or more of: a price at which an item is being offered; a store name (virtual online, or physical, e.g., local brick and mortar); a brief description of the items being offered; a physical distance from a shopper's location to the store at which the items is being offered; a link to share the listing with someone; a link to a map showing directions from the shopper's current location, or some shopper-specified location, to the store; a travel time indicating how long (in time) it would take the shopper to travel via a particular mode, to the location of the store at which the product is being offered; and a quantity of a product being offered at the store. With some embodiments, search results for online virtual stores may be shown separate from the search results for locally available items, while in some embodiments, the search results are intermingled, and/or arranged according to some other specific aspect or attribute, such as price. With some embodiments, a shopper may filter the search results to only view items located at stores within a threshold distance; located at stores within a threshold travel time (where the mode of travel can be specified), that have prices that are less than, or exceed, some threshold price, and so forth.

The shopper may actuate the app to begin optimizing the shopping list. Alternatively any of a plurality of automatic actuations may be employed. For example, if the mobile device GPS system detects that the device is moving more than a predetermined distance, the system may assume the shopper is traveling to do the shopping indicated by the shopping list, and this may trigger the app or, in some embodiments, the scanning layer, to begin the scanning discussed above and assembling a list and begin the shopping optimization. The system would then run a search against retailers, taking into account factors such as loyalty cards, coupons, discounts offered by stores, and purchase history of the shopper, which narrows the list in order to optimize the shopping trip. Based on the foregoing, cost lookups and inventory data for each item on the list can be performed at nearby (or favorite) stores (using Milo®, or a similar service, for example). The optimizer may generate one or more lists with total costs or may divide the list among different nearby stores in an attempt to find the optimal set of stores from which to purchase the items. Such objectives may include price (factoring in on-sale items, the above-mentioned loyalty cards, coupons, discounts), the purchase preferences or history of the shopper), travel time, most efficient use of time, number of stops, transportation options, fuel costs, sufficiency of inventory for each individual item, the preferred brands or types in the shopper's preference list or history, or other predetermined objectives, which may be set by the shopper. Dividing purchase of the items among stores may be based on insufficient quantity at a single store, and may also be based on the above objectives. For example, one store may have the better price (factoring in on-sale items, the above-mentioned loyalty cards, coupons, discounts and the purchase history of the shopper) for some of the items and another store may have the better price for other items on the shopping list. As another example, one store may have the preferred brand for some of the items, and another store may have the preferred brand for other of the items.

Consistent with some embodiments, a web-based search engine cooperates with the mobile app to optimize a shopping list and return to a client computing device, either mobile, stationary, or to both a mobile device and to a stationary device, the shopping list organized based on predetermined objectives, as discussed above. In alternate embodiments, a shopper may enter one or more selections into the shopper's mobile device indicating the shopper's objectives. In one embodiment the shopper may select time, which would cause the system to generate a list with the shortest travel time. In another embodiment the shopper may select lowest cost. In another embodiment, the shopper could select brands and stores, in which case the optimization would be limited to the shopper's preferred store based on the shopper's preference list or purchase history (obtained as discussed below), and brands specified or, if not specified on the list, the preferred brands in the shopper's preference list or history. In another embodiment, a list may be generated based on one or more of the above selections, such as shortest travel time and preferred stores. In some instances a specific brand (brand X) of item is selected by the shopper, or entered from the shopper's preference list, and the system may search for brand X. The system may also search for alternate brands and find such a good price for the same item in brand Y, that the system may prompt the shopper as to whether brand Y at the given price might preferred. Likewise, the foregoing good price may be found online instead of at a bricks and mortar store and the shopper may be prompted as to whether to purchase the item online if the price can be obtained. The price trigger point for such prompts may be predetermined either by the system, or by the shopper, for example by entering percentage discounts that would cause the shopper to be prompted to determine whether the shopper prefers to depart from a stated preference.

The mobile device may also allow entry of preorder, reservation, or hold options to allow for the shopper to preorder an item such as take-out food or hold an item or quantity of item, and then execute the shopping list with time of the trip, including likely time at each store, factored into time of the trip, and the distances involved, including the distance from the final store to the restaurant to pick up the take-out order at the desired time.

With some embodiments, the shopper may toggle the presentation of the optimized list between distance and time, such that the search results can be ordered based on distance (e.g., the geodesic distance, or distance as the crow flies) or, the more practical and useful measure—the time required to travel between the location of the shopper and the location of the store offering the items presented in a search result. With some embodiments discussed above, the shopper can specify a mode of transportation (e.g., walking, biking, automobile, public transportation, etc.) and the travel time to obtain the items on the shopping list will be derived based on the routes available when travelling via the selected mode. With some embodiments, various filtering criteria may be applied. For example, the shopper may request that the shopping list be optimized with respect to one or more stores that are within a predefined travel time, or distance. Similarly, a shopper may indicate a preference for shopping only at specific stores (e.g., Apple® Store, Best Buy®, Wal-Mart®, and so forth) to obtain the shopping list organized by items being offered only by those stores.

With some embodiments, the shopping list may be organized by the shopper interacting with a map. In particular, with some embodiments, the shopper may interact with a map to specify anyone or more of: the starting location to be used for deriving the distance or travel time to the items associated with the individual search results; a specific geographical region of interest, from which to display search results; a corridor or commuting route—from which any point along the corridor can be used as the starting point to derive the distance to a store associated with a search result. The map may be presented as part of a web-based map application, a desktop computer application, or an application that is specific to a particular mobile computing platform (e.g., such as Apple's iOS, or Google's Android operating systems.)

Optimal lists may be presented to the shopper along with directions and/or a map to direct the shopper to the different stores. The optimization could also include accessing a shopper's purchase history or preferences, discussed above, via one or more retailers, online e-commerce providers (e.g., eBay), data recorded in the app, all coupons, discounts, in-store specials, and the like to aid in compiling the costs for the list of items. For example, if the list includes a generic term like "ground beef", the list could be augmented and the costs could be made more accurate by recognizing from the shopper's purchase history the shopper prefers to purchase organic ground beef as the type preference. Also, optimized in-store directions could provide a specifically ordered shopping list to direct a shopper to the items within the store. The directions could specify an ordered path within a store for picking up items on the list. For example, the directions could tell a shopper to pick up items 2 and 4 from aisle 1, and then swing over to aisle 2 to pick up item 1, then aisle 3 for item 3, etc.

Shopping

As used herein, "shopping" may be viewed as executing the shopping list. The shopper obtains the list optimized by the system and enters into a bricks and mortar store. As the shopper picks up the various shopping items they may be checked off the list, either by shopper selection of a selectable icon or other indicator (e.g., image, text, button) on the mobile device or, in more efficient manner for the shopper, by gesture, by taking a photo, by scanning the item bar code, or other suitable action. The shopper may take a photograph of the items by the mobile device as the items are entered into the shopping cart or, in some instances, by taking a photograph of all items in the cart. As mentioned above, the items may be checked off the list by device gesture. A non-exhaustive list of device gestures may be seen in the Appendix. As items are checked off the list they may be transmitted wirelessly to the store's system which may then use the data to prepare a Point of Sale (POS) check-out list such that time waiting in line to check out and pay for the goods will be minimized. Gestures, which may entail turning on the device camera for gesture recognition, may not be capable of identifying the item picked up by the user. However, gestures could be function to identify the item picked up if the list were specifically ordered (e.g., #1 milk, #2 soap, #3 apples) as discussed above, and then when the user picks up the first item, he performs the gesture and the system interprets the gesture to mean that the user picked up milk. This would depend on the user following the list and picking up the items in the specified order. In general it might be easier to just perform a device gesture. For example, the device gesture could leverage an accelerometer of the device so that if the shopper "waves" the device over the item or shake the device or move the device some other way, the device (which is ordinarily not moving) records or detects a movement of the device and maps that movement to the recognized gesture of picking up an item.

Gestures are more of an intuitive way of crossing items off the list so that when the shopper looks at the list, he or she doesn't have to recount each item in the shopping basket and manually cross it off. Gestures may not be sufficient to determine specific brand or type of item purchased. To know what specific type of apple was purchased, the shopper may scan the barcode or enter the product code into the app or obtain a copy of the receipt of items purchased and map "apples" to "Fuji Apples, 2.3 lbs., $5.50" on the receipt.

In one embodiment, the system may also prompt the shopper after an item is checked off the list in order to update the shopper's preference list over time. For example, the system may tap into PayPal or a similar service to determine a list of the shopper's past preferences and determine that the shopper prefers Fuji apples to Granny Smith apples. For example, if during shopping the shopper checked off apples, the system may prompt, "Did you buy Fuji apples?" The reply may be used in continually updating of the shopper's preferences (purchase history). If the shopper over time begins buying Granny Smith more often than Fuji, the preference list will change the shopper's preference in apples to Granny Smith.

In another embodiment, purchase history (preference) list update may be accomplished automatically by entering the data on the POS check-out list if that data is available to the app and using the data to update preferences. The App may be designed to update the shopper's preferences at or after checkout, when the items are actually purchased. For example, the app could receive a receipt or detailed list of items purchased and could use that receipt/list to update user preferences with items actually purchased. This could be accomplished via a payment provider or point-of-sale provider hooking into the mobile app and providing a digital copy of the receipt. Or the receipt could be obtained from the retailer (via API call), especially if the retailer already lets the user link the retailer loyalty card into the app. For example, if the store or the payment provider has a system that is "open" it may allow the app to have access to the transaction data. In another embodiment, the credit card processor for the shopper's credit card may allow the shopper to have access to the transaction data. Alternatively, the user may take a photo of the paper receipt from the POS and scan/OCR the receipt and import it into the app to determine items purchased.

If the store won't expose transaction data, then coupons that are redeemed will be exposed since if a Campbell soup coupon is redeemed it shows that the shopper bought Campbell soup. For example, a mobile app may expose coupons to the shopper and allow the shopper to link/load coupons to the shopper's loyalty card account. When the shopper checks out at the retailer and signs in at the POS with the shopper's loyalty card (swipe, enter phone #) and buys the item having the associated coupon, the POS knows to apply the coupon to the purchase of the item. The mobile app will know the coupon is redeemed based on post-transaction processing (it knows the shopper bought the item and that the coupon was used), so if the shopper can get coupon redemption data from the retailer or from the coupon provider (e.g., the manufacturer, the distributor, the coupon company), that could be another way to determine what specific item is purchased by a user.

Example System

FIG. 1 is a block diagram depicting a system 100 for delivering search results, according to an example embodiment. The system 100 can include a shopper 110, a network-based publication system 120 with a search engine, and one or more merchants 130 (and merchant systems). In an example, the shopper 110 can connect to the network-based publication system 120 via a client computing device 115 (e.g., desktop, laptop, smart phone, PDA, or similar electronic device capable of some form of data connectivity). The network-based publication system 120 will receive and process a query from the shopper's client computing device. Generally, location information specifying the physical or geographical location of the shopper will be received with the query. For example, if the device is a mobile device, a GPS unit may inform the device of its location, such that the location information of the device can be shared with the network-based publication system 120. Other known techniques for deriving location information may be used with both mobile and non-mobile client computing devices, for example, such as desktop computers, etc. For instance, with some embodiments, the location information indicating the location of the shopper may be explicitly specified by the shopper, for example, by the shopper interacting with a map.

In an example, the merchant 130 can operate computer systems, such as an inventory system 132 or a POS system 134. The network-based publication system 120 can interact with any of the systems used by merchant 130 for operation of the merchant's retail or service business. In an example, the network-based publication system 120 can work with both POS system 134 and inventory system 132 to obtain access to inventory available at individual retail locations run by the merchant. This inventory information can be used in both generating items listings, and selecting and ordering search results served by the network-based publication system 120.

Example Operating Environment

Figure 2:
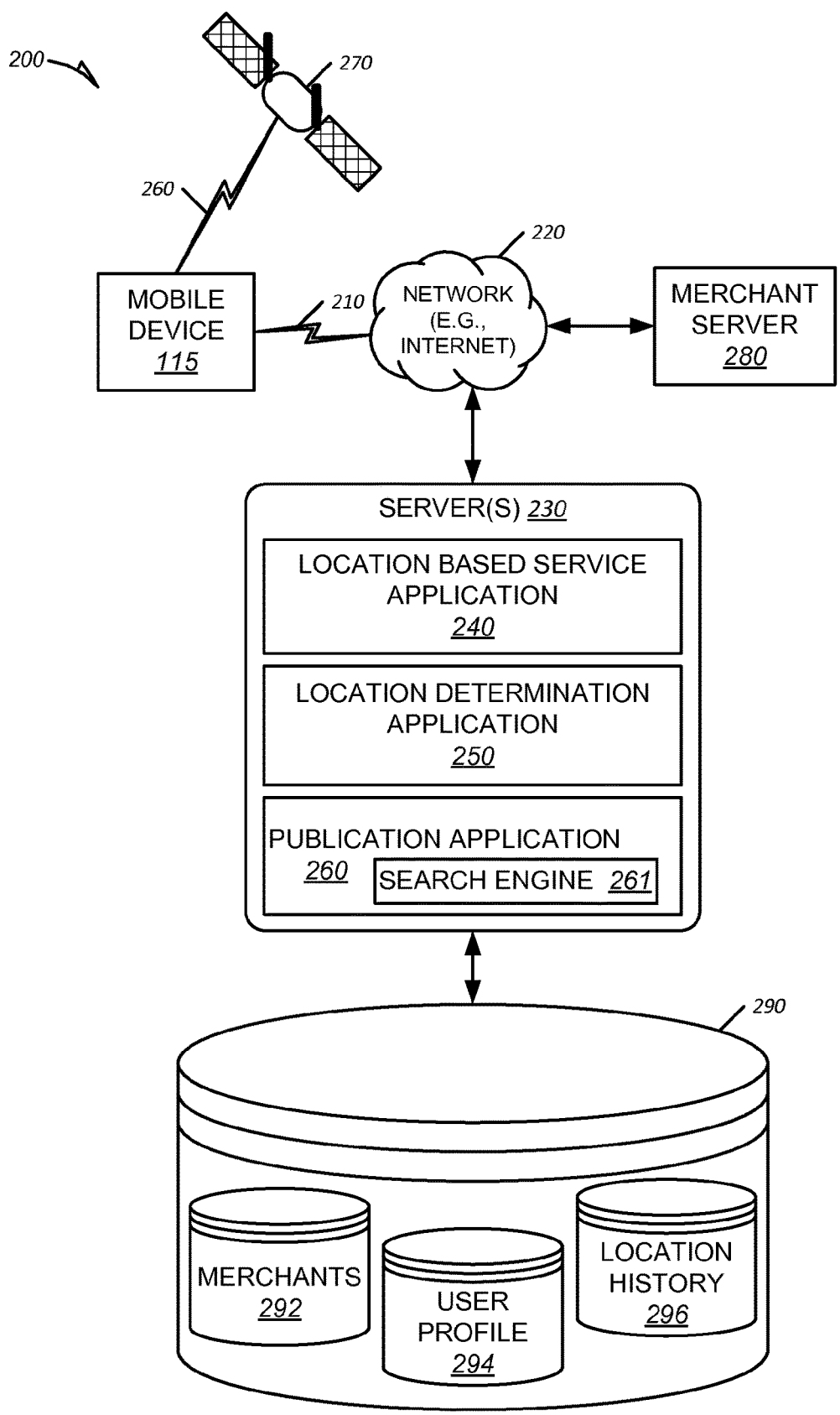
FIG. 2 is a block diagram illustrating an environment for operating a mobile device, according to an example embodiment.

With some embodiments, the shopper may explicitly indicate or specify his current location for use in deriving a distance or travel time to stores offering products/services. However, with some embodiments, location information of the shopper may be derived with a mobile computing device of the shopper. FIG. 2 is a block diagram illustrating an environment 200 for operating a mobile device 115, according to an example embodiment. The environment 200 is an example environment within which methods of serving search results can be operated. The environment 200 can include a mobile device 115, a communication connection 210, a network 220, servers 230, a communication satellite 270, a merchant server 280, and a database 290. The servers 230 can optionally include location based service application 240, location determination application 250, and publication application 260 with search engine 261. The database 290 can optionally include merchant databases 292, shopper profile database 294, and/or location history database 296. The mobile device 115 represents one example device that can be utilized by a shopper to receive offers and share context information associated with the shopper. The mobile device 115 may be any of a variety of types of devices (for example, a cellular telephone, a PDA, a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone networks (PSTN), a packet-switched data network, or other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute location based service (LBS) applications 240, which interoperate with software executing on the mobile device 115, to provide LBSs to a shopper. LBSs can use knowledge of the device's location, and/or the location of other devices and/or retail stores, etc., to provide location-specific information, recommendations, notifications, interactive capabilities, and/or other functionality to a shopper. With some embodiments, the LBS operates in conjunction with the publication application 260 and search engine 261, in particular, do provide search results that are arranged based on the distance or travel time between a mobile device 115 (or other computer device) and a retail store. For example, an LBS application 240 can provide location data to a network-based publication system 120, which can then be used to arrange a set of search results, based on distance and/or travel time between two locations. Knowledge of the mobile device's location, and/or the location of other devices, may be obtained through interoperation of the mobile device 115 with a location determination application 250 executing on one or more of the servers 230. Location information may also be provided by the mobile device 115, without use of a location determination application, such as application 250. In certain examples, the mobile device 115 may have some limited location determination capabilities that are augmented by the location determination application 250.

Example Mobile Device

Figure 3:
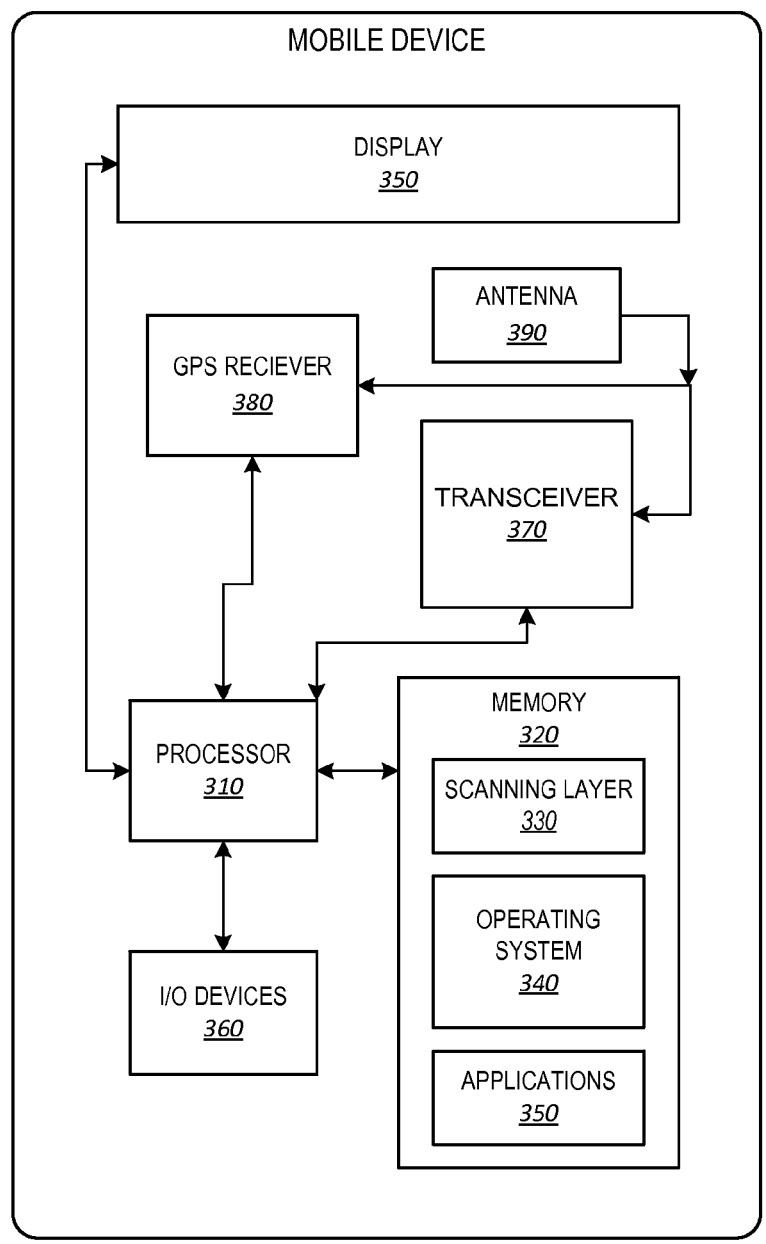
FIG. 3 is a block diagram illustrating a mobile device, according to an example embodiment.

FIG. 3 is a block diagram illustrating the mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 340, as well as application programs 350, such as the above-discussed mobile app, and a location enabled application that may provide LBSs to a shopper. The scanning device discussed above is seen at 330. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Additional detail regarding providing and receiving location-based services can be found in U.S. Pat. No. 7,848,765, titled "Location-Based Services," granted to Phillips et al. and assigned to Where, Inc. of Boston, Mass., which is hereby incorporated by reference.

An example geo-location concept discussed within U.S. Pat. No. 7,848,765 is a geofence. A geofence can be defined as a perimeter or boundary around a physical location or mobile object (e.g., a shopper). A geofence can be as simple as a radius around a physical location defining a circular region around the location. However, a geofence can be any geometric shape or an arbitrary boundary drawn on a map. A geofence can be used to determine a geographical area of interest for the calculation of demographics, advertising, presenting search results, or similar purposes. Geofences can be used in conjunction with identifying and presenting search results, as described herein. For example, a geofence can be used to assist in determining whether a shopper (or mobile device associated with the shopper) is within a geographic area of a particular merchant. If the shopper is within a geofence established by the merchant or the publication system, the systems discussed herein can use that information to identify and present search results (e.g., via a mobile device associated with the shopper).

Example Platform Architecture

Figure 4:
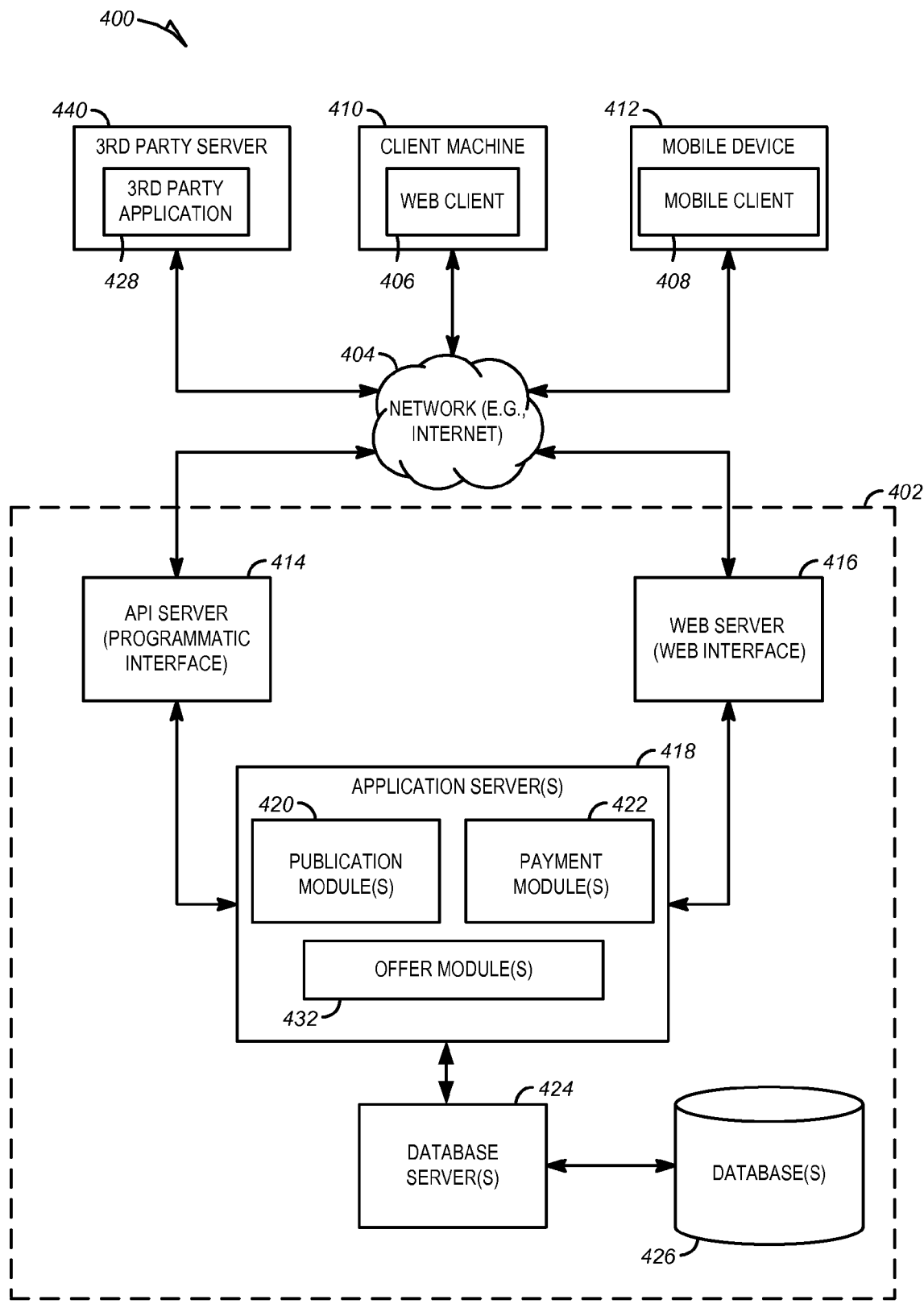
FIG. 4 is a block diagram illustrating a network-based system for use in optimizing lists of items based on a predetermined objective, according to an example embodiment.

FIG. 4 is a block diagram illustrating a network-based system 400 for processing a search query, and presenting search results, as described more fully herein. The block diagram depicts a network-based system 400 (in the exemplary form of a client-server system), within which an example embodiment can be deployed. A networked system 402 is shown, in the example form of a network-based location-aware publication, advertisement, or marketplace system, that provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Wash. State) and a programmatic client 408 executing on respective client machines 410 and 412. In an example, the client machines 410 and 412 can be in the form of a mobile device, such as mobile device 115.

An Application Programming Interface (API) server 414 and a web server 416 are coupled to, and provide programmatic and web interfaces respectively to, one or more application servers 418. The application servers 418 host one or more publication modules 420 (in certain examples, these can also include search engine modules, commerce modules, advertising modules, and marketplace modules, to name a few), payment modules 422, and dynamic offer modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication and search functions and services to shoppers that access the networked system 402. The payment modules 422 may likewise provide a number of payment services and functions to shoppers. The payment modules 422 may allow shoppers to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 may also be configured to present or facilitate a redemption of offers, generated by the location-aware offer modules 432, to a shopper during checkout (or prior to checkout, while the shopper is still actively shopping). The offer modules 432 may provide dynamic context sensitive offers (e.g., coupons or immediate discount deals on targeted items) to shoppers of the networked system 402. The offer modules 432 can be configured to use all of the various communication mechanisms provided by the networked system 402 to present offer options to shoppers. The offer options can be personalized based on current location, time of day, shopper profile data, past purchase history, or recent physical or online behaviors recorded by the network-based system 400, among other things (e.g., context information). While the publication modules 420, payment modules 422, and offer modules 432 are shown in FIG. 4 to all form part of the networked system 402, it will be appreciated that, in alternative embodiments, the payment modules 422 may form part of a payment service that is separate and distinct from the networked system 402. Additionally, in some examples, the offer modules 432 may be part of the payment service or may form an offer generation service separate and distinct from the networked system 402.

Further, while the system 400 shown in FIG. 4 employs a client-server architecture, the present embodiment is of course not limited to such an architecture, and could equally well find application in a distributed, or peer-to-peer, architecture system, for example. The various publication modules 420, payment modules 422, and offer modules 432 could also be implemented as standalone systems or software programs, which do not necessarily have networking capabilities.

The web client 406 accesses the various publication modules 420, payment modules 422, and offer modules 432 via the web interface supported by the web server 416. Similarly, the programmatic client 408 accesses the various services and functions provided by the publication modules 420, payment modules 422, and offer modules 432 via the programmatic interface provided by the API server 414. The programmatic client 408 may, for example, be a smartphone application that enables shoppers to communicate search queries to the system while leveraging shopper profile data and current location information provided by the smartphone or accessed over the network 404.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the offer modules 432 for configuration purposes. In certain examples, merchants can use programmatic interfaces provided by the API server 414 to develop and implement rules-based pricing schemes that can be implemented via the publication modules 420, payment modules 422, and offer modules 432.

Example Methods

Figure 5:
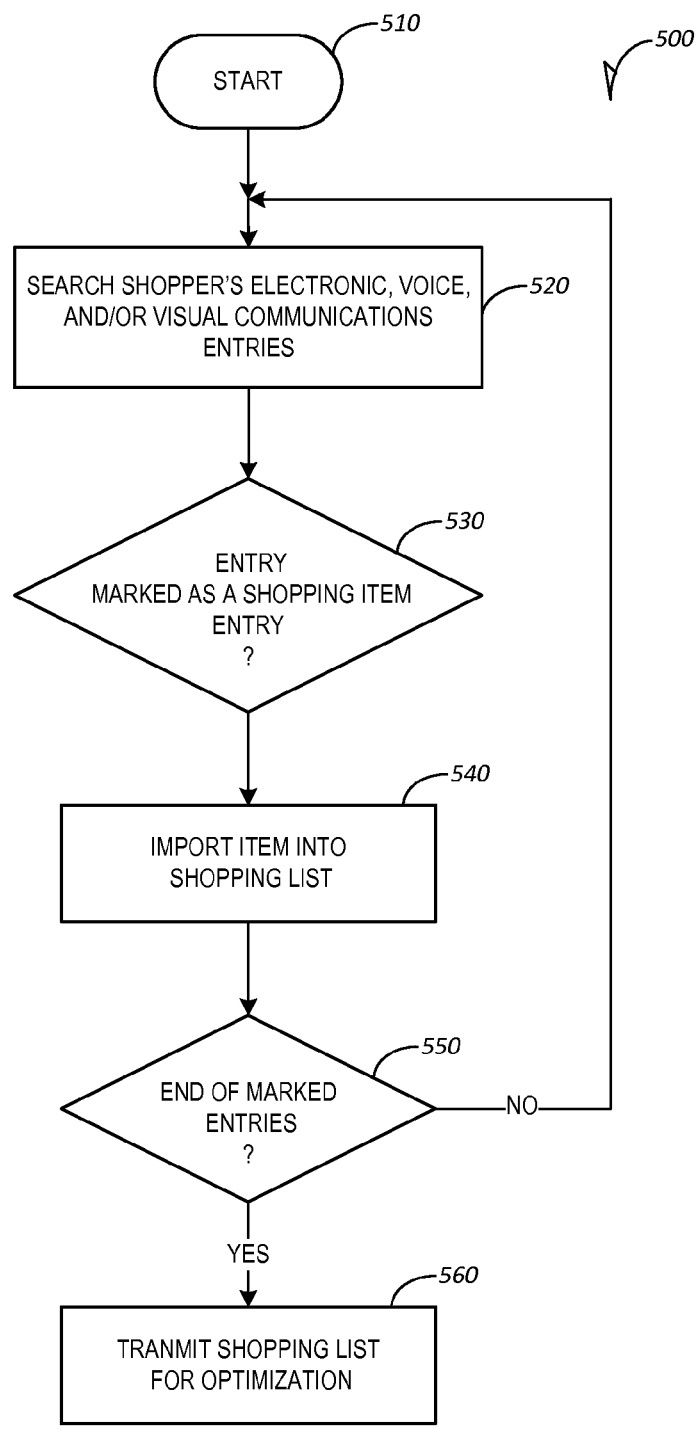
FIG. 5 is a flowchart illustrating a method for creating a list of items, according to an example embodiment.

FIG. 5 is a flowchart illustrating a method 500 for creating a shopping list according to an embodiment. The method starts at 510 and at 520 the mobile app, or the scanning layer, searches at the shopper's electronic communications, such as email and text, voice communications such as voice mails, and/or visual communications processing a search query, according to an example embodiment. As discussed above, the mobile app or the scanning layer can be actuated and set to scan for a predetermined time period, a predetermined number of messages, or messages from a particular person, each of which may be set by the shopper, to determine relevant emails, texts (such as the above text message), voice mail, photos, instant chat messages, videos, and the like that are appropriately designated as including shopping list content. A decision is taken at 530 to determine whether a particular entry, such as an email, text, photo, voice mail or is appropriately marked as a shopping item. If Yes, the item is imported, or entered, into the shopping list at 540. A decision is taken at 550 to determine whether the scanning has reached the end of the entries marked as shopping items. If the decision is No, then the shopper's communication entries are scanned again at 520 and the method continues. When the end of the marked entries is reached at 550, the decision takes the Yes leg and the shopping list is transmitted for optimization. One of ordinary skill in the art will readily understand that the shopping list may be temporarily stored for later transmission for optimization.

Figure 6:
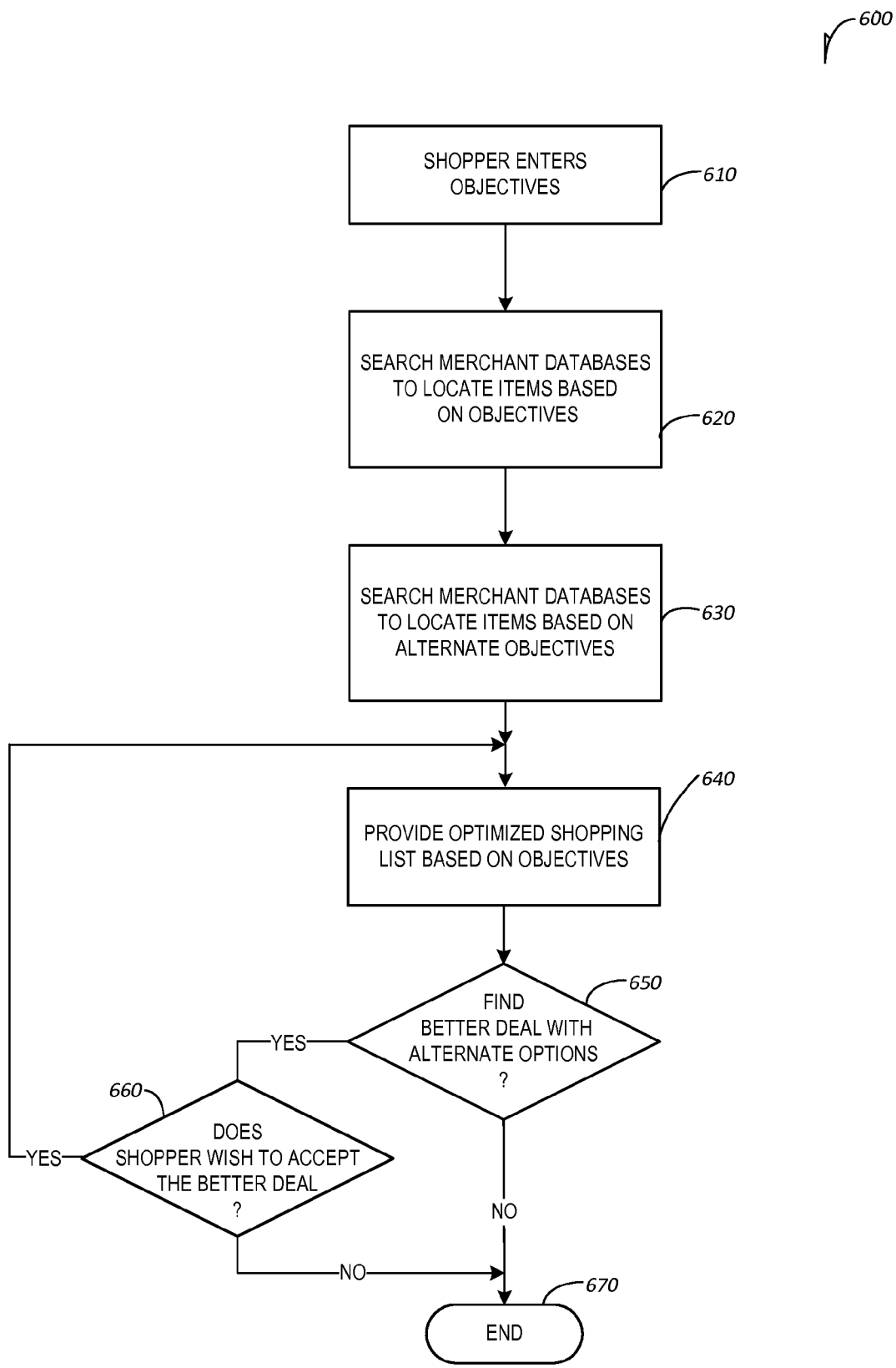
FIG. 6 is a flowchart illustrating a method for optimizing a list of items, according to an example embodiment.

FIG. 6 is a flowchart illustrating a method 600 for optimizing a shopping list, according to an example embodiment. At 610 the shopper enters the optimization objective, such as time, price, or an entry from the shopper's purchase history, or other objectives. As discussed above, the objective may be efficient use of time, which would cause the system to generate a list with the shortest travel time. In another embodiment the shopper may select lowest cost as the objective. In another embodiment, the shopper could select brands and stores, in which case the optimization would be limited to the shopper's preferred store based on the shopper's preference list and brands specified or, if not specified on the list, the preferred brands in the shopper's preference list or history. Other objectives include number of stops in the shopping route, or transportation options. In another embodiment, the optimized list may be generated based more than one of the above objectives, such as shortest travel time and preferred stores. The objectives may include demographic data such as shopper's age and/or other physically identifying data (e.g., height, weight, gender), mode of transportation, and similar objectives. From the foregoing data the optimization can take into account how much weight and space the mode of transportation can carry. Other examples can be given from the above discussion of shopping objectives. At 6230 the mobile app, perhaps in conjunction with server 230 that optionally includes location based service application 240, location determination application 250, and publication application 260 with search engine 261, searches merchant databases to locate items based on the objectives. At 630 the same or a similar search may be made, but based on alternate objectives such as alternate brands. The shopping list is optimized by arranging the shopping items associated with the locations found at 620 in accordance with the above parameters and objectives. A decision is taken at 640 to determine whether a better deal, or buy, has been found using the alternate options as seen at 630. If No, the method ends at 670. If the Yes decision is taken, a decision is then taken at 660 to determine whether the shopper wishes to accept the better deal even though it is based on an alternate objective. If Yes, the optimized shopping list at 640 is updated with the store of the better deal. If No, the method ends.

Figure 7:
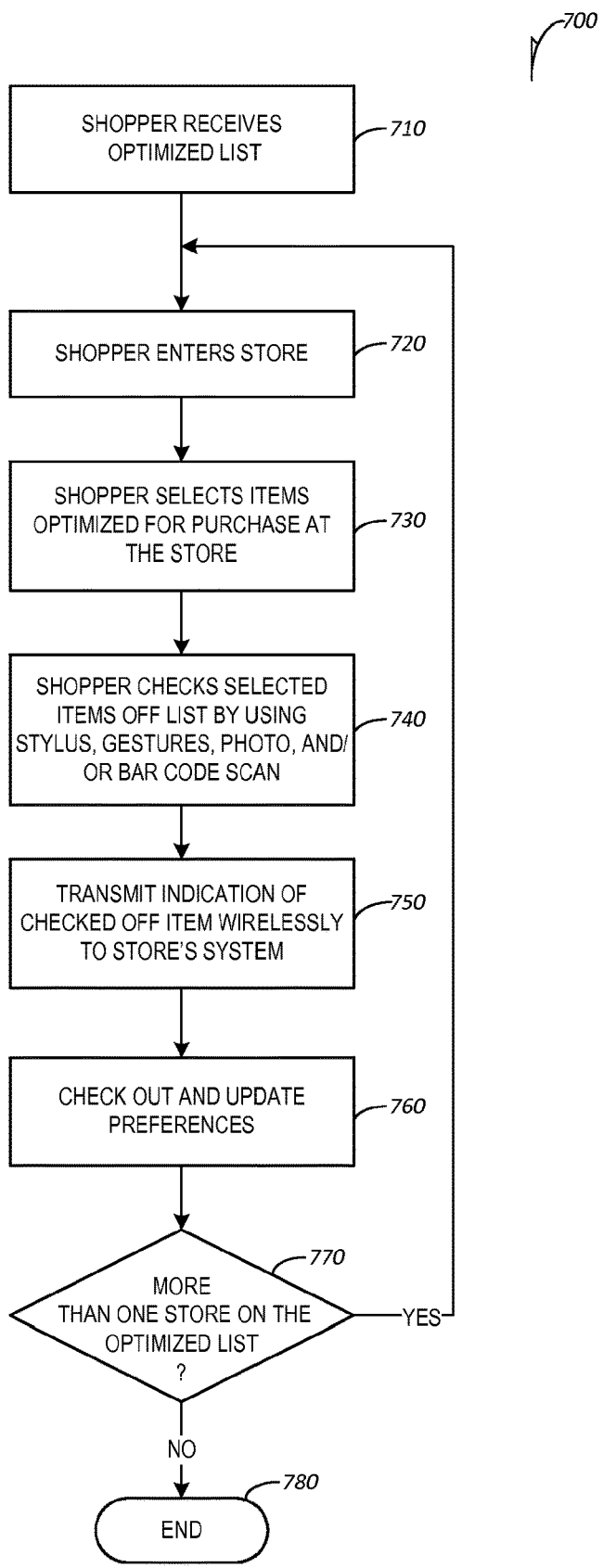
FIG. 7 is a flowchart illustrating a method for checking selected items off a list of items and updating objectives for locating and acquiring the items, according to an example embodiment.

With the shopping list organized, the shopper may complete the shopping trip. FIG. 7 is a flowchart illustrating a method 700 for checking selected items off a shopping list and updating shopping objectives, according to an example embodiment. At 710 the shopper receives the optimized shopping list at 710, and at 720 enters the brick and mortar store to purchase the items optimized for purchase at the store based on the objective of the shopping trip. At 730 the shopper selects the items off the shelf. At 740 the shopper checks selected items off the list. This may be accomplished by gesture, by taking a photo, by scanning the item bar code, or other suitable action. The shopper may take a photograph of the items by way of the mobile device as the items are entered into the shopping cart or, in some instances, by taking a photograph of all items in the cart. As items are checked off the list, the system may, as discussed above, prompt the shopper to determine whether the shopper selected type or brand of item on the shopper's preference list, in order to update the shopper's preference list over time. As items are checked off the list they may, in some embodiments, be transmitted wirelessly to the store's system at 750 which may then use the data to prepare a Point of Sale (POS) check-out list such that time waiting in line to check out and pay for the goods will be minimized. In other embodiments, the shopper proceeds to check out and the shopper's preferences are updated at 760. As discussed above, the mobile app may be designed to update the shopper's preferences at or after checkout, when the items are actually purchased. For example, the app could receive a receipt or detailed list of items purchased and could use that receipt/list to update user preferences with items actually purchased.

At 770 a decision may be taken to determine whether there is more than one store on the optimized list. If Yes, the method repeats beginning at step 720. If No, the method ends at 780.

Example Overlay for User Interface

Figure 8:
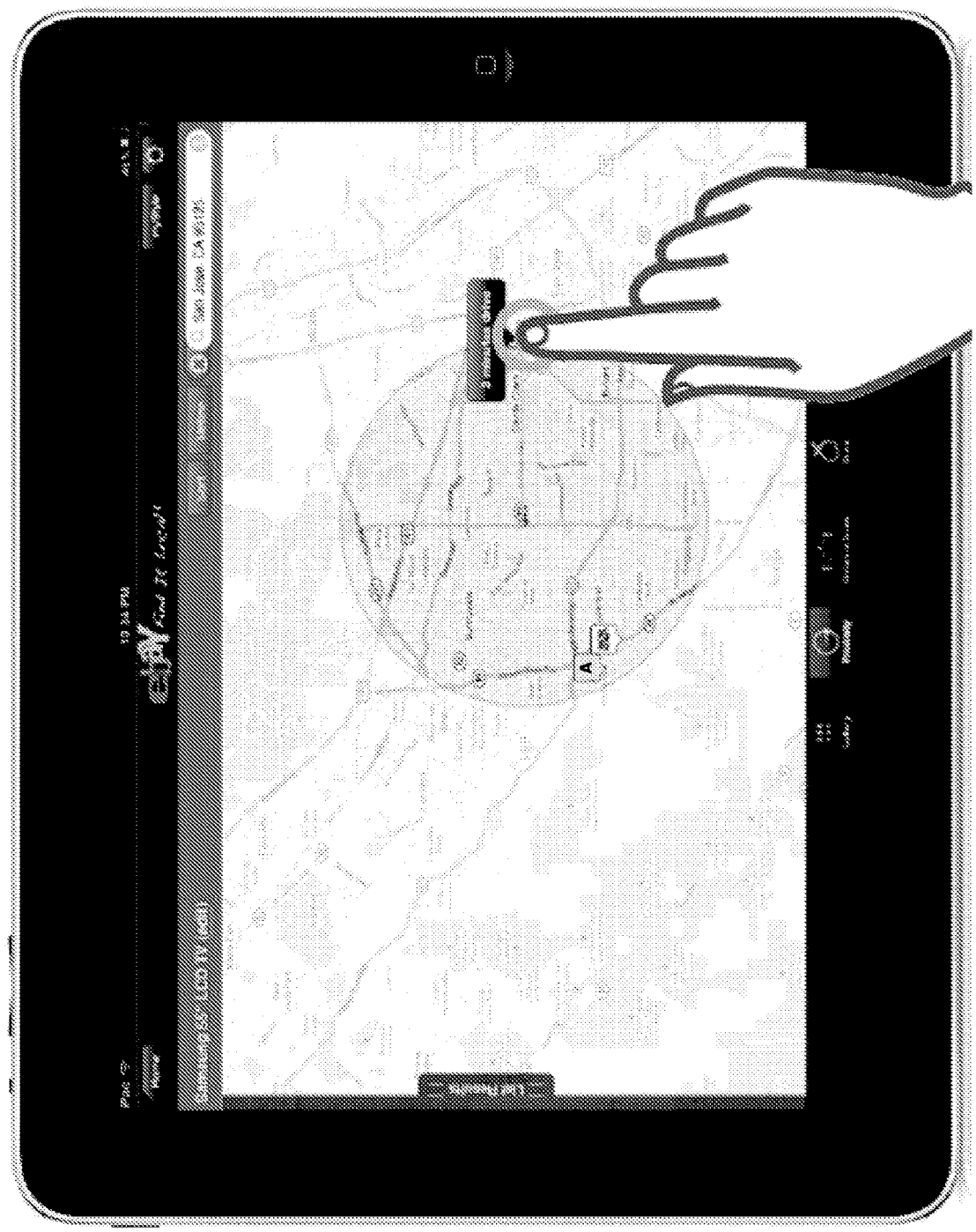
FIG. 8 is a diagram showing an overlay for a user interface that may be used in optimizing a list of items, according to an example embodiment.

FIG. 8 illustrates an example shopper interface of an application for a mobile device including an interactive map on which search results can be shown, according to some embodiments. As illustrated in FIG. 8, the shopper can indicate a geographical region of interest. In this example the shopper has simply placed his finger in a first location on the map and then dragged his finger to generate a circle, which will serve as the geographical area of interest for purposes of filtering and presenting the search results. Assuming the shopper selects as the center of the circle is current location, the shopper will be presented with a quick visual presentation of the locations and names of stores where items on the shopping list are being offered in accordance with the above objectives.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 9:
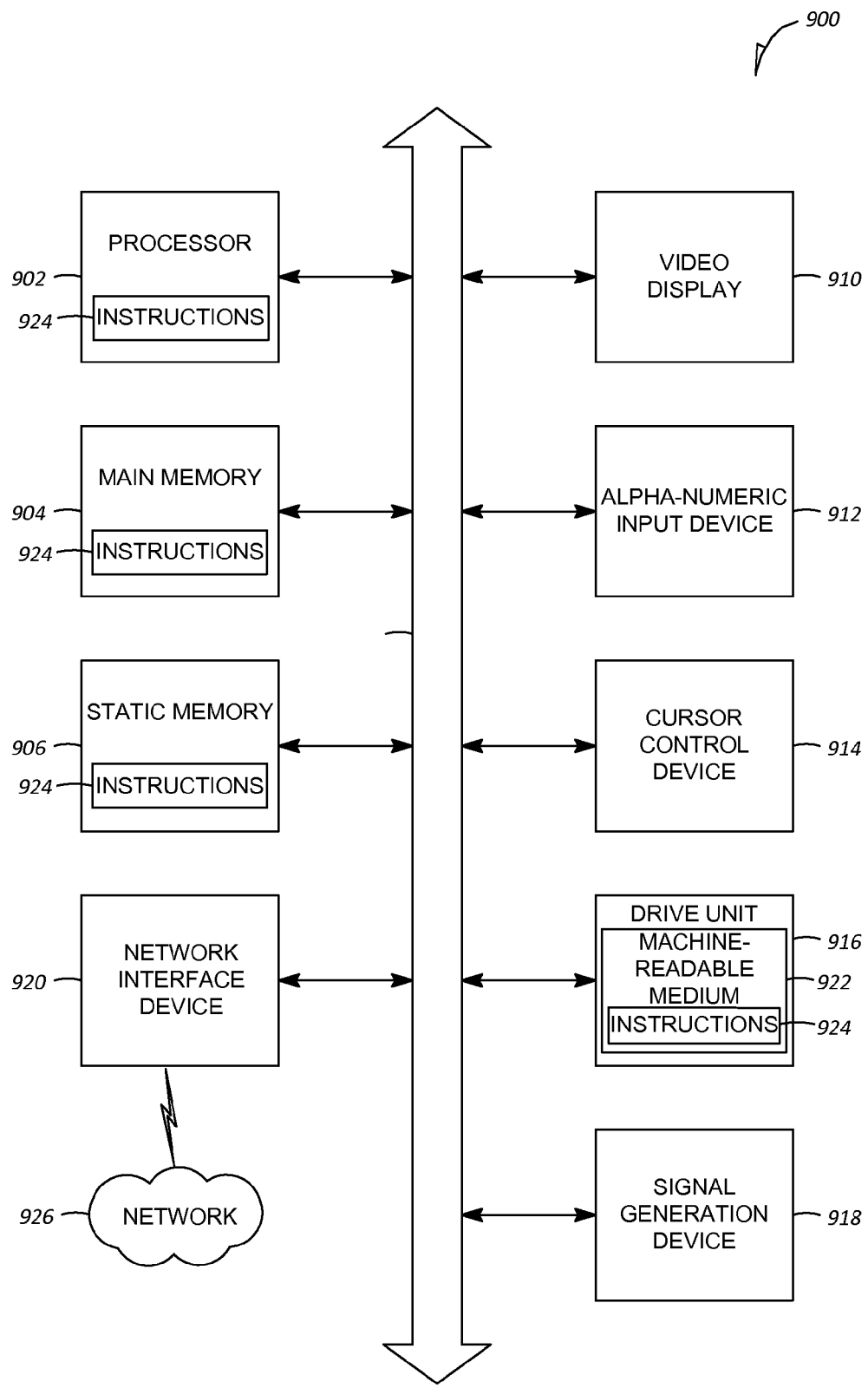
FIG. 9 is a diagrammatic representation of a machine in the example form of a computer system within which a set of instructions for causing the machine to perform any one or more of the methodologies discussed herein may be executed.

FIG. 9 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 901 and a static memory 906, which communicate with each other via a bus 908. The computer system 900 may further include a display unit 910, an alphanumeric input device 917 (e.g., a keyboard), and a shopper interface (UI) navigation device 911 (e.g., a mouse). In one embodiment, the display, input device and cursor control device are a touch screen display. The computer system 900 may additionally include a machine-readable storage device 916 (e.g., drive unit), a signal generation device 918 (e.g., a speaker), a network interface device 920, and one or more sensors 921, such as a global positioning system sensor, compass, accelerometer, or other sensor.

The drive unit 916 includes a machine-readable medium 922 on which is stored one or more sets of instructions and data structures (e.g., software 923) embodying or utilized by any one or more of the methodologies or functions described herein. The software 923 may also reside, completely or at least partially, within the main memory 901 and/or within the processor 902 during execution thereof by the computer system 900, the main memory 901 and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present embodiment, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 923 may further be transmitted or received over a communications network 926 using a transmission medium via the network interface device 920 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although specific example embodiments have been described herein, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

APPENDIX

1. Mouse Click=Tap Event
A tap event acts the same way as a mouse click on the desktop:
2. Click/Drag=Touch Begin/End
When you're doing a click and drag on mobile consider using touch_begin and touch_end:
3. Long Tap
A long tap can be used to show a submenu on the image selected. For instance, a long tap on an image might activate a submenu allowing the shopper to save the photo. The functionality uses a timer that counts down one second before showing the menu.
4. Two-Finger Tap
A two-finger tap is another way to add additional functionality to an image. Two fingers can reveal a submenu.
5. Pinch to Zoom
Pinch to zoom in and out on such things as maps and photos.
6. Pan Event
If an image or list is larger than the screen size then use the pan event to reveal the additional content.
7. Rotate Event
Allows the shopper to use two fingers to rotate an item. Great for a game or even for any photos.
8. Swipe Up/Down/Left/Right
Allows shoppers to move through multiple screens or through long text fields.

The invention claimed is:
1. A system comprising:
   at least one processor and instructions accessible on a computer-readable storage medium, the instructions causing the at least one processor to perform operations comprising:
   receiving, by a first mobile device application, via a wireless communication channel, at least one electronic message from a second mobile device,
   determining, by the first mobile device application that received the at least one electronic message from the second mobile device, that the at least one electronic message has been received from a previously specified user associated with the second mobile device, the previously specified user having been specified by a user of the first mobile device application;
   in response to determining, by the first mobile device application, that the at least one electronic message has been received from the previously specified user associated with the second mobile device, processing, by the first mobile device application, content of the at least one electronic message to extract data from the at least one electronic message;
   determining, by the first mobile device application, that the extracted data identifies a tangible item and is associated with a stored shopping list;
   responsive to determining that the extracted data identifies the tangible item and is associated with the stored shopping list and in response to determining that the at least one electronic message has been received from the previously specified user, adding, by the first mobile device application, the extracted data that identifies the tangible item to the stored shopping list;

removing the data that identifies the tangible item from the shopping list in response to receiving an input based on a gesture from the user of the first mobile device application;

retrieving historical data associated with the user of the first mobile device application;

determining, based on the historical data, an amount of weight or bulk the user can carry based on demographic data of the user and physically identifying data of the user; and optimizing the shopping list, based on the determined amount of weight or bulk the user can carry.

2. The system of claim 1, wherein the operations further comprise:

searching for a replacement item, corresponding to the tangible item on the shopping list:

determining whether a price of the replacement item is lower than a price of the tangible item by more than a threshold, the threshold being specified by the user;

prompting the user of the first mobile device application to purchase the replacement item instead of the tangible item in response to determining that the price of the replacement item is lower than the price of the tangible item by more than the threshold; and updating the shopping list based on a response received from the user to the prompt.

3. The system of claim 1, wherein the operations further comprise:

receiving a receipt of purchased items with the first mobile device application; and updating preferences for the user based on the received receipt.

4. The system of claim 3, wherein the operations further comprise:

capturing, by the first mobile device application, a photograph of a given item on the shopping list; and in response to capturing the photograph of the given item, causing the given item to be checked off the shopping list.

5. The system of claim 4, wherein the operations further comprise:

in response to removing the data that identifies the tangible item from the shopping list, prompting the user of the first mobile device application to specify a type or brand of the tangible item; and updating a shopping preference list for the user based on the specified type or brand input by the user.

6. A computer implemented method comprising:

receiving, by a first mobile device application, via a wireless communication channel, at least one electronic message from a second mobile device;

determining, by the first mobile device application that received the at least one electronic message from the second mobile device, that the at least one electronic message has been received from a previously specified user associated with the second mobile device, the previously specified user having been specified by a user of the first mobile device application;

in response to determining, by the first mobile device application, that the at least one electronic message has been received from the previously specified user associated with the second mobile device, processing, by the first mobile device application, content of the at least one electronic message to extract data from the at least one electronic message;

determining, by the first mobile device application, that the extracted data identifies a tangible item and is associated with a stored shopping list;

responsive to determining that the extracted data identifies the tangible item and is associated with the stored shopping list and in response to determining that the at least one electronic message has been received from the previously specified user, adding, by the first mobile device application, the extracted data that identities the tangible item to the stored shopping list;

removing the data that identifies the tangible item from the shopping list in response to receiving an input based on a gesture from the user of the first mobile device application;

retrieving historical data associated with the user of the first mobile device application;

determining, based on the historical data, an amount of weight or bulk the user can carry based on demographic data of the user and physically identifying data of the user; and optimizing the shopping list based on the determined amount of weight or bulk the user can carry.

7. The method of claim 6, further comprising:

searching for a replacement item, corresponding to the tangible item on the shopping list:

determining whether a price of the replacement item is lower than a price of the tangible item by more than a threshold, the threshold being specified by the user;

prompting the user of the first mobile device application to purchase the replacement item instead of the tangible item in response to determining that the price of the replacement item is lower than the price of the tangible item by more than the threshold; and updating the shopping list based on a response received from the user to the prompt.

8. The method of claim 6, further comprising receiving a receipt of purchased items with the first mobile device application; and updating preferences for the user based on the received receipt.

9. The method of claim 6, further comprising:

capturing, by the first mobile device application, a photograph of a given item on the shopping list; and in response to capturing the photograph of the given item, causing the given item to be checked off the shopping list.

10. The method of claim 6, further comprising:

in response to removing the data that identifies the tangible item from the shopping list, prompting the user of the first mobile device application to specify a type or brand of the tangible item; and updating a shopping preference list for the user based on the specified type or brand input by the user.

11. A non-transitory computer readable medium comprising non-transitory computer readable instructions for performing operations when executed by one or more processors, the operations comprising:

receiving, by a first mobile device application, via a wireless communication channel, at least one electronic message from a second mobile device;

determining, by the first mobile device application that received the at least one electronic message from the second mobile device, that the at least one electronic message has been received from a previously specified user associated with the second mobile device, the previously specified user having been specified by a user of the first mobile device application;

in response to determining, by the first mobile device application, that the at least one electronic message has been received from the previously specified user associated with the second mobile device, processing, by the first mobile device application, content of the at least one electronic message to extract data from the at least one electronic message;

determining, by the first mobile device application, that the extracted data identifies a tangible item and is associated with a stored shopping list;

responsive to determining that the extracted data identifies the tangible item and is associated with the stored shopping list and in response to determining that the at least one electronic message has been received from the previously specified user, adding, by the first mobile device application, the extracted data that identifies the tangible item to the stored shopping list; and removing the data that identifies the tangible item from the shopping list in response to receiving an input based on a gesture from the user of the first mobile device application;

retrieving historical data associated with the user of the first mobile device application;

determining, based on the historical data, an amount of weight or bulk the user can carry based on demographic data of the user and physically identifying data of the user; and optimizing the shopping list based on the determined amount of weight or bulk the user can carry.

12. The non-transitory computer readable medium of claim 11, wherein the operations further comprise:

searching for a replacement item, corresponding to the tangible item on the shopping list;

determining whether a price of the replacement item is lower than a price of the tangible item by more than a threshold, the threshold being specified by the user;

prompting the user of the first mobile device application to purchase the replacement item instead of the tangible item in response to determining that the price of the replacement item is lower than the price of the tangible item by more than the threshold; and updating the shopping list based on a response received from the user to the prompt.

13. The non-transitory computer read medium of claim 11, wherein the operations further comprise:

receiving a receipt of purchased items with the first mobile device application; and updating preferences for the user based on the received receipt.

14. The non-transitory computer readable medium of claim 11, wherein the operations further comprise;

capturing, by the first mobile device application, a photograph of a given item on the shopping list; and in response to capturing the photograph of the given item, causing the given item to be checked off the shopping list.

15. The non-transitory computer readable medium of claim 11, wherein the operations further comprise:

in response to removing the data that identifies the tangible item from the shopping list, prompting the user of the first mobile device application to specify a type or brand of the tangible item; and updating a shopping preference list for the user based on the specified type or brand input by the user.

* * * * *